(12) United States Patent
Sessions et al.

(10) Patent No.: US 7,756,735 B2
(45) Date of Patent: Jul. 13, 2010

(54) SYSTEM AND METHOD FOR MANAGING THE COMPLEXITY OF LARGE ENTERPRISE ARCHITECTURES

(76) Inventors: Roger Sessions, 8950 Clarann Ln., Chappell Hill, TX (US) 77426; Beverly Bammel, 8950 Clarann Ln., Chappell Hill, TX (US) 77426

( * ) Notice: Subject to any disclaimer, the term of this patent is extended or adjusted under 35 U.S.C. 154(b) by 84 days.

(21) Appl. No.: 11/946,432

(22) Filed: Nov. 28, 2007

(65) Prior Publication Data
US 2008/0126035 A1  May 29, 2008

Related U.S. Application Data

(60) Provisional application No. 60/867,416, filed on Nov. 28, 2006.

(51) Int. Cl.
*G06F 17/40* (2006.01)
(52) U.S. Cl. .......................................................... 705/7
(58) Field of Classification Search ...................... 705/7
See application file for complete search history.

(56) References Cited

U.S. PATENT DOCUMENTS

| | | | | |
|---|---|---|---|---|
| 6,957,186 | B1 * | 10/2005 | Guheen et al. | 705/1 |
| 7,162,427 | B1 * | 1/2007 | Myrick et al. | 705/1.1 |
| 7,610,575 | B2 * | 10/2009 | Sproule | 717/103 |
| 2003/0110070 | A1 * | 6/2003 | De Goeij | 705/8 |
| 2006/0161879 | A1 * | 7/2006 | Lubrecht et al. | 717/101 |

OTHER PUBLICATIONS

Bahrami et al "Enterprise architecture for business process simulation", Dec. 1998, Winter Simulation Conference archive, Proceedings of the 30th conference on Winter simulation, pp. 1-5.*
Zackman "Concepts of the Framework for Enterprise Architecture", Dec. 1997, Information Engineering Services Pty Ltd, pp. 1-22.*
Bernus Enterprise models for enterprise architecture and ISO9000:2000, Dec. 2003, Annual Reviews in Control vol. 27, Issue 2, 2003, pp. 211-220.*
Liles et al "Enterprise modeling within an enterprise engineering framework", Dec. 1996, Proceedings of the 1996 Winter Simulation Conference, pp. 1-7.*
Zackman "Enterprise Architecture: Looking back and looking ahead", 1999, Zachman International, pp. 1-9.*

(Continued)

*Primary Examiner*—Romain Jeanty
(74) *Attorney, Agent, or Firm*—Rick B. Yeager

(57) ABSTRACT

A process for developing Enterprise Architectures that results in a dramatic reduction in the complexity of the architecture and, therefore, in the cost of developing, implementing, and maintaining that architecture. The process is novel in that it is based on a mathematical model for complexity and how complexity can be reduced. The process for constructing enterprise architectures can also validate the architecture before it is implemented. The process begins by partitioning the Enterprise Architecture into autonomous subunits using the equivalence relation synergistic. It then uses type relations between these autonomous subunits to identify redundancies which can be simplified through consolidation. Once these autonomous subunits have been simplified as much as possible through consolidation, outsourcing, or functionality reduction, they are prioritized through risk/value analysis pictorially represented as Risk/Value Graphs.

12 Claims, 5 Drawing Sheets

OTHER PUBLICATIONS

Pereira (A method to Define an Enterprise Architecture using the Zachman Framework), Dec. 2004, ACM Symposium on Applied computing, pp. 1-6.*

Kaisler (Enterprise Architecting: Critical Problems), Dec. 2005, Proceedings of the 38$^{th}$ Hawaii International Conference on Systems Sciences, pp. 1-10.*

Steen et al (Supporting Viewpoint-Oriented Enterprise Architecture), Dec. 2004, IEEE Computer Society, pp. 1-11.*

Amour et al (Enterprise Architecture: Agile Transition and Implementation), Dec. 2001, IT Pro, pp. 1-8.*

Barnett et al (An Architecture for the Virtual Enterprise), Dec. 1994, IEEE International Conference on Systems, pp. 1-7.*

Nightingale (Enterprise Systems Architecting: Emerging Art and Science within Engineering Systems), Dec. 2004, pp. 1-13.*

* cited by examiner

SIP Process 1000

SYSTEM AND METHOD FOR MANAGING THE COMPLEXITY OF LARGE ENTERPRISE ARCHITECTURES

CROSS-REFERENCE TO RELATED APPLICATIONS

This non-provisional application is related to U.S. Provisional Application No. 60/867,416 filed Nov. 28, 2006, and claims priority from that application

BACKGROUND

1. Field of Invention

Enterprise Architecture (EA) is the field that is concerned with analyzing how business processes work within an organization and how technology can be leveraged to improve those processes. The term EA can refer either to the discipline that defines how such an analysis is done or to a specific analysis of a specific organization.

2. Prior Art

There are many ways an EA can be valuable to an organization. For example, an EA can help find redundancies and thereby identify opportunities to consolidate functionality. An EA can be used to find inefficient processes and identify opportunities to use technology to improve those processes. An EA can be used to find non-critical business processes that can be outsourced, allowing the organization to focus on the critical differentiating processes that define competitive advantage.

EA efforts are typically very expensive. The cost is dominated by three primary factors:

The exhaustive timeframes over which analysis takes place

The large number of highly placed internal staff that become absorbed by the process The army of expensive consultants that are necessary to navigate through the complex methodologies Despite the considerable investment in EA, far too often the efforts result in failure. A good example of such failures can be seen in the United States Federal Government, an organization that has invested billions of dollars in EA. Yet despite these efforts, hardly a month goes by in which the Government Accountability Office (GAO), an independent watchdog branch of the U.S. Government, does not issue a scathing report on the failures of some government agency to effectively make use of EA. It seems that the more critical the government agency, the more likely it is to have major EA failures.

A recent article in IEEE Spectrum included this gloomy assessment:

"Looking at the total investment in new software projects—both government and corporate—over the last five years, I estimate that project failures have likely cost the U.S. economy at least $25 billion and maybe as much as $75 billion. Of course, that $75 billion doesn't reflect projects that exceed their budgets—which most projects do. Nor does it reflect projects delivered late—which the majority are. It also fails to account for the opportunity costs of having to start over once a project is abandoned or the costs of bug-ridden systems that have to be repeatedly reworked." (Why Software Fails, by Robert N. Charette in *IEEE Spectrum*, September, 2005, available at http://www.spectrum.ieee.org/sep05/1685)

Anytime we see a major failure of a software effort, the cause can be directly traced to a failure to apply EA methodologies.

One of the most common reasons for EA failure is complexity. As business processes and technology both increase in complexity they become increasingly difficult to understand, and if they are not understood, alignment between the two becomes all but impossible.

As Richard Murch succinctly put it in a recent article in *InformIT*,

"To let IT infrastructures and architectures become increasingly complex with no action is unacceptable and irresponsible. If we simply throw more skilled programmers and others at this problem, chaos will be the order of the day . . . . Until IT vendors and users alike solve the problem of complexity, the same problems will be repeated and will continue to plague the industry." (*Managing Complexity in IT, Part* 1: *The Problem* in InformIT, Oct. 1, 2004 By Richard Murch)

There are a number of EA methodologies today, the three most common being The Open Group Architectural Framework (better known as TOGAF), The Zachman Framework for Enterprise Architecture (better known simply as Zachman), and the Federal Enterprise Architecture (better known as FEA).

All of these methodologies share some commonality. All start by exhaustively analyzing the business processes. They then continue with an exhaustive analysis of the current technical architecture and finally they exhaustively analyze the desired architecture.

Theses processes are slow and cumbersome, often taking a year or more to complete and sometimes require the full-time efforts of a dozen people or more. Frequently, by the time the process is completed, the fundamental business problems that drove the effort in the first place have changed and the solutions are no longer relevant. Many times the process is abandoned before the effort has been completed.

Even when EAs are produced, existing methodologies offer no means to evaluate the results. There is no way to tell of the resulting enterprise architecture is good, bad, or indifferent. Only by going through the hugely expensive step of implementing the designs will one find out if the designs themselves were any good.

Existing EA methodologies are highly subjective, with architectural decisions guided only by the personal experience, opinions, and preferences of the practitioner. This means that different practitioners are likely to come up with substantially different results

SUMMARY OF INVENTION

The invention comprises five distinct pieces: (1) a definition for what constitutes a good EA; (2) a mathematical model that helps us understand, mathematically, what good looks like; (3) a series of mathematically grounded algorithms that are used to create a good EA; (4) a process that embodies these algorithms to make them easy to learn and apply; and (5) a criteria for testing EAs against the mathematical model before one goes through the expensive stage of implementation.

Figure 1:
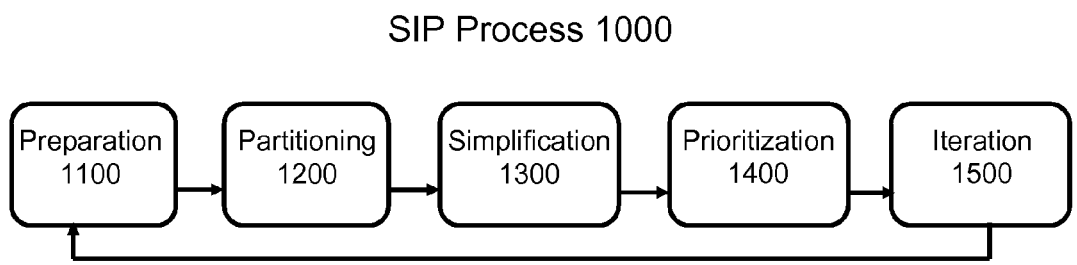
FIG. 1 is a flowchart of an overview of the Simple Iterative Partitioning (SIP) Process.

DEFINITION OF TERMS autonomous subsets: one or more subsets of elements are autonomous when any element of one subset is autonomous with respect to any element in the other subset or subsets.

autonomous: two elements, say A and B, are autonomous with respect to each other when A is not dependent on B or B is not dependent on A, or both.

enterprise: any large organization such as a business, a non-profit organization, or a governmental operation.

enterprise architecture: a description of an enterprise with particular focus on the business processes that make up the enterprise and the information technologies that support those business processes.

equivalence relation: a logical function that returns TRUE or FALSE, takes two arguments, and exhibits the mathematical properties of reflexivity, symmetry, and transitivity.

mathematical model for complexity: a mathematical model that describes complexity and how it can be reduced.

minimally complex enterprise architecture: an enterprise architecture that has the minimum amount of complexity possible while still fulfilling the business objectives of an enterprise architecture.

model for enterprise architectural complexity: a model that describes how complexity in an enterprise architecture is related to a general mathematical model for complexity.

partition: a set of subsets of a universe such that every element in the original universe is contained in one and only one of the subsets.

partition subset: One of the subsets that is an element of the set of subsets that collectively make up a partition.

synergistic: an equivalence relation that is defined as mutual dependency, in other words, two elements A and B are synergistic if A is dependent on B and B is dependent on A (both must be true).

validation test: a test that can be applied to an enterprise architecture to see if it is a minimally complex enterprise architecture.

DESCRIPTION OF EMBODIMENT

Manual Simple Iterative Process

One embodiment of the current invention comprises five distinct pieces: (1) a definition for what constitutes a good EA; (2) a mathematical model that helps us understand, mathematically, what good looks like; (3) a series of mathematically grounded algorithms that are used to create a good EA; (4) a process that embodies these algorithms to make them easy to learn and apply; and (5) a criteria for testing EAs against the mathematical model before one goes through the expensive stage of implementation.

Each one of these is a significant innovation over existing EA methodologies. Existing methodologies lack any definition of good. None are based on mathematical models. None have algorithms, mathematically grounded or otherwise, that focus on the issue of EA goodness. None have processes that focus on the EA solution. None have a criteria that can be applied to an EA solution to test it for goodness.

Let's consider each of these in turn: the definition of good, the mathematical model of good, the mathematically grounded algorithms, the process for producing a good EA, and the criteria that can be used to test a good EA.

Definition of Good

This invention defines a good EA as the one that is minimally complex. Our main premise is that of two EAs that both solve a given problem, the less complex of the two is the better one. The more complex of the two is the worse one.

We believe that the fundamental problem that an EA must solve is managing complexity. This is a very different starting point than existing methodologies, which believe that the fundamental EA problem is aligning technology and business processes. Of course, we agree that this alignment is an ultimate goal. But we believe that unless complexity is first brought under control, there is no hope of achieving this alignment. And further, if complexity is brought under control, then this alignment reduces to a simple problem.

Mathematical Model of Good

One advantage of defining a good EA as a minimally complex EA is that we can mathematically model what we mean by minimally complex, and, therefore, by what we mean by good.

Mathematically, we define the complexity of a system as a function of the number of states in which a system can find itself. We can model this with dice.

Let's use dice to get a handle on this notion of complexity. We can compare the complexity of two systems, System A and System B. Say System A is composed of a single two-headed die (i.e., a "coin") and System B is composed of a single six-sided die (i.e., a standard die).

System A has two potential states: heads and tails. System B has six potential states: 1, 2, 3, 4, 5, and 6. Based on the idea of complexity being related to states, System B is 6/2, or 3 times more complex than System A. Equivalently, System A is 1/3 as complex as System B.

In general, the number of states of a System of D die, each with S sides, is $S^D$. With this formula, we can calculate the complexity of other systems of dice. For example, take the same System B and a new System C, which consists of three six-sided die.

The number of states of B is still $6^1$, or 6. The number of states of C is $6^3$, or 216. According to our understanding of complexity, System C is 216/6, or 36 times more complex than System B. Or equivalently, System B is 1/36 as complex as System C. If Systems B and C both do the same thing, then System B is the better system based on our definition of better as less complex. How much better is System B? Thirty-six times better, to be exact.

EAs, of course, don't care about complexity of dice. They care about complexity of software systems and of business processes. However it turns out that mathematically, both software systems and business processes behave much like dice.

In software systems, complexity is related to the number of states in the software system. A software system that has two variables (say, VARIABLE-ONE and VARIABLE-TWO), each of which can contain one of two values (say, TRUE or FALSE) has a total of four possible states (VARIABLE-ONE=TRUE VARIABLE-TWO=TRUE; VARIABLE-ONE=FALES VARIABLE-TWO=TRUE, VARIABLE-ONE=FALSE VARIABLE-TWO=FALSE, and VARIABLE-ONE=TRUE VARIABLE-TWO=FALSE). The variables act like dice. Adding more variables into a system is mathematically similar to adding more dice into a system. A software system that has twelve variables, each of which can take six states has the same complexity as a dice system that has twelve dice each with six faces. Any technique that we can apply to simplify the dice system will be equally applicable to simplification of the software system.

The same is true for business processes, although here it is decision points that behave like dice. A decision point in a business process is a point at which a question is asked and a choice is made between two or more possible paths depending on the answer. For example, in a mortgage application process, one decision point might be "Application Complete?" with two possible paths, one for Application IS Complete and another for Application IS NOT Complete. Adding more decision points into a business process is mathematically similar to adding more dice to a system. A business process that has twelve decision points, each of which can go in one of six paths has the same complexity as a dice system that has twelve dice each with six faces. Any technique that we can apply to simplify the dice system will be equally applicable to simplification of the business process.

Mathematically Grounded Methods for Complexity Control

So far, we have defined better as less complex and we have created a mathematical model for analyzing complexity. We can now describe some methods for reducing complexity. These algorithms fall in two categories: partitioning and state reduction.

Partioning

The first category of algorithms is partitioning.

Recall from the mathematical model discussion that a system of three six-headed dice (System C) has a complexity measure of $6^3$, or 216. Let's compare this to System D. System D also has three dice, but now these dice are partitioned into three sub-systems, say $D_1$, $D_2$, and $D_3$, each with one of the original dice.

What is the complexity of this partitioned System D? To answer this question, we need to look at the complexity of each of the sub-systems. Since they are all equivalent in terms of dice and therefore complexity, we can consider any of the sub-systems, say $D_1$.

$D_1$ contains one dice with six faces. Our mathematical model tells us that it has a complexity rating of $6^1$, or 6. Of course, System D has three similar sub-systems, so the total complexity of D is 3×6, or 18.

So by partitioning, the complexity of system D has been reduced from 216 (before partitioning) to 18 (after partitioning). This is a reduction in complexity of 91%.

As the number of dice increase, the complexity reductions become magnified. Consider, for example, the complexity of System E of 12 un-partitioned dice compared to system F of the same dice partitioned into 3 subsets. The complexity value for System E is $6^{12}$, or 2,176,782,336. The complexity value for System F is $3\times6^4$, or 3×1,296, or 3888. So by partitioning System E into three subsets, we reduce its complexity by more than 99.9999%.

Since software systems behave like dice (from a complexity perspective) partitioning of a software system into autonomous subsets will have a similar impact on software complexity as does the partitioning of dice on complexity. Likewise for business processes.

When trying to partition any collection of items, whether those items are dice, software variables, or business paths, there are a large number of ways that we could assign items into the subsets that make up the partition.

For example, if our twelve dice are stamped somehow with a sequence number from 1 through 12, we could put dice 1, 2, 3, and 10 in one subset; 3, 4, 5, and 11 in another subset; and 5, 6, 7, and 12 in another. Or we could put 1-4 in one subset, 5-8 in another, 9-12 in another. Any of these will work as far as dice complexity goes.

But for software systems and business processes, it does matter how we do our partitioning. If we partition things together that need to be together, our resulting system will work. If we partition things apart that need to be together, our resulting systems will not work. Since we want our resulting systems to work, we need to find a way to partition so that things that need to be together stay together and things that can be split apart are split apart.

Equivalence Relations

Mathematically, partitions are closely related to another concept called equivalence relations. An equivalence relation (E) is a binary (true/false) relation over some universe of elements (e.g., dice, variables, or decision points) such that for any elements—say, a, b, and c—the following three properties are always true:

E(a, a) is always true—known as the property of reflexivity

E(a, b) always implies E(b, a)—known as the property of symmetry

E(a, b) and E(b, c) always implies E(a, c)—known as the property of transitivity To see how equivalence relations are related to partitions, let's color our twelve dice. We can start by grabbing any four dice and coloring them blue. Color another four dice red and leave the last four white.

We now have an equivalence relation that can be applied to the dice, namely, SameColorAs. We can see that SameColorAs is an equivalence relation because it is binary (returns true/false), it is reflexive (every die is the SameColorAs itself), it is symmetric (if die A is the SameColorAs die B, then die B must be the SameColorAs A) and it is transitive (if die A is the SameColorAs die B and die B is the SameColorAs die C, then die A must be the SameColorAs die C).

We can now use this equivalence relation to create our partition of three subsets. If we divide up our dice based on which ones are the SameColorAs each other, we will end up with three subsets of dice, one containing the red dice, one containing the blue dice, and one containing the white dice.

Notice that the use of this equivalence relation takes much of the randomness out of subset creation. Without the equivalence relation, three different people might have divided up the dice three different ways. But if we tell people to divide up the dice using the equivalence relation, there is no ambiguity. No matter how many people we ask to divide up the dice, we will end up with the same dice in the same subsets.

This analysis tells us how to partition our software system so that like stays with like. First, find an equivalence relation that identifies which pieces of software are like which others. Second, use that equivalence relation to partition the original software. Since the resulting division of software elements is guaranteed to be a partition, and since mathematically partitioned collections of elements are guaranteed to be much less complex than non-partitioned elements, we know that the result of applying this equivalence relation will greatly simplify our software system.

This same process works just as well on business processes. Find the correct equivalence relation, use that relation to partition, and now you have a much less complex system.

Since both software (or information technology) systems and business processes are components of enterprise architectures, by partitioning the enterprise architecture we in effect partition the underlying software systems and business processes.

State Reduction

The next class of algorithms we will use are the state reduction algorithms. The are algorithms that are applied to the system after partitioning has been completed.

Once again, we can see how these work by considering the twelve dice system after it is has been partitioned into three subsets. We are now seeking opportunities to further reduce the total number of states in the overall system. There are two approaches we follow.

First, we can remove dice from the subsets. For example, if we remove one dice from each subset and throw it away, the overall complexity goes from $3\times6^4$ to $3\times6^3$, or from 3888 to 648.

Second, we can remove entire subsets. For example, if we remove one of our three subsets and throw it away (along with the dice inside), the overall complexity goes from $3\times6^4$ to $2\times6^4$, or from 3888 to 2592.

Once again, these same approaches will work with either software systems or business processes, or with both when applied at the level of enterprise architecture.

Process of Applying Algorithms

In this embodiment, the overall process of applying these complexity-reducing algorithms on an enterprise architecture is called Simple Iterative Partitioning (SIP). Simple refers to the application of state reduction algorithms to the partitioned architecture. Iterative refers to the preferred delivery mode for implementing subsets of the overall architecture. Partitioning refers to that part of the process that partitions the enterprise architecture into smaller autonomous subsets.

A high level view of SIP is shown in FIG. 1 which is a flowchart showing an overview of the SIP process. As seen in FIG. 1, the SIP Process 1000 is broken into fives smaller steps: Preparation at step 1100, Partitioning at step 1200, Simplification at step 1300, Prioritization at step 1400, and Iteration at step 1500. This is the preferred embodiment of the current invention. Other embodiments are possible, for example, Prioritization 1400 and Iteration 1500 could be consolidated into one step. Or Iteration 1500 could be eliminated entirely in favor of an implementation model that implements and delivers the EA as a complete package rather than completed subsets.

Figure 2:
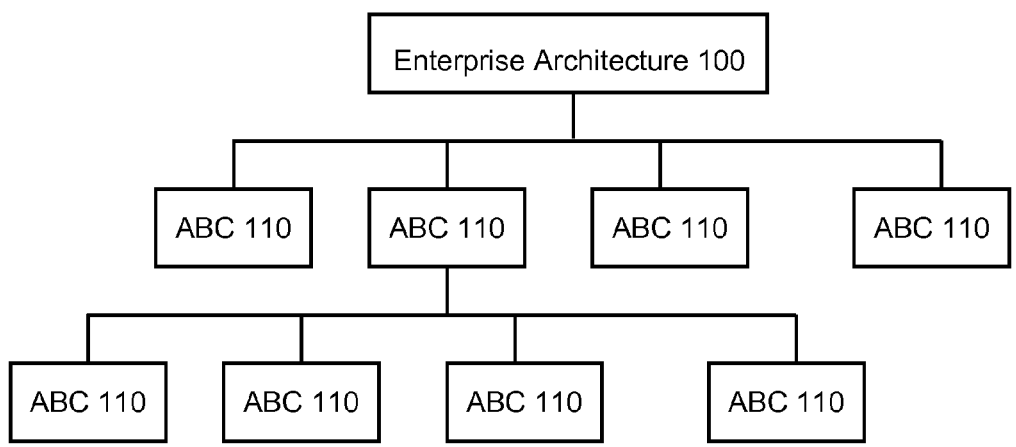
FIG. 2 is a chart of an Enterprise Architecture partitioned into autonomous business capabilities (ABCs).

FIG. 2 is a chart of an Enterprise Architecture partitioned into autonomous business capabilities (ABCs). As shown in FIG. 2, an EA 100 can be partitioned into a number of ABCs 110, each of which can itself be partitioned into lower level ABCs 110.

Preparation

Referring again to FIG. 1, in the Preparation 1100 phase, the SIP Process 1000 is prepared for delivery within an organization. Much of the Preparation 1100 phase will be specific to the organization. Most organizations have not focused on managing complexity and therefore extensive preparation is needed. Typically there are tools that must be specialized for the organization, document templates that must be created, processes that must be modified to fit within the organization's structure, and training that must occur on EA 100, the mathematics of complexity, and the SIP Process 1000.

Partitioning

The second phase of the SIP Process 1000 is the Partitioning 1200 phase. In this phase, we apply the partitioning algorithms to the overall enterprise to create a set of subsets of the enterprise. We call these subsets ABCs 110, for autonomous business capabilities.

Figure 3:
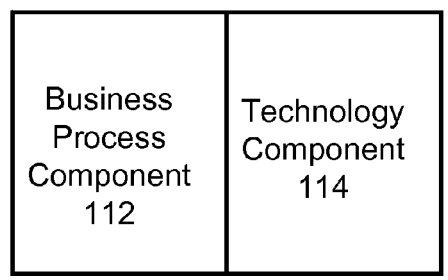
FIG. 3 is a diagram showing the components of an ABC.

FIG. 3 is a diagram showing the components of an ABC. As shown in FIG. 3, an EA 100 comprises two basic components, a Business Process Component 112 and a Technology Component 114. Recall that an EA 100 represents the business processes and the technology processes of an organization, and how the business processes and the technology processes align together to deliver business value.

As shown in FIG. 2, the EA 100 will be partitioned into subsets, any one of which is called an ABC 110. Since the ABCs 110 contain the related Business Process Components 112 and Technology Components 114, the process of partitioning the EA 110 at step 1200 effectively also partitions both the technology and the business processes of the enterprise.

Recall from the mathematical discussions, anytime we have partitioned a collection of interacting elements (such as dice or, in the case of EAs 100, technology systems and business processes) we greatly simplify that collection. Given that both the technology and the business processes are effectively partitioned (indirectly, through the partitioning of the ABCs 110) we now have a greatly simplified view of both the business processes and technologies that collectively make up the EA 100.

The next question is, how do we go about partitioning the EA 100 so that the resulting ABCs 110 make sense? For example, if we ended up with all of the business and technologies relating to managing delivery trucks, cleaning restrooms, and totaling purchase orders in one particular ABC 110, we might intuitively understand that this collection is not a good collection. So how do we go about assigning elements of the EA 100 to ABCs 110 so that we have meaningful ABCs 110?

As discussed earlier, partitions are closely related to equivalence relations. If we can find an appropriate equivalence relation that can be used to assign elements of the EA 100 to subsets (ABCs 110) then we can be sure that those subsets (ABCs 110) are collectively a partition of the original EA 100.

Synergistic Elements

The equivalence relation used in the preferred embodiment of this invention is synergistic. Two elements of an EA 100 are defined as synergistic when the presence of one always implies the presence of the other.

We can show that synergistic, as defined here, is an equivalence relation. It is binary, in that it compares two elements. It is Boolean, in that it returns TRUE (if two elements are synergistic) or FALSE (if the two elements are not synergistic). It is reflexive, in that any element of the universe is synergistic with itself. It is symmetric, in that if A is synergistic with B, then B is synergistic with A. And it is transitive, in that if A is synergistic with B and B is synergistic with C then A is synergistic with C.

Example

For example, consider the following five elements: check-inventory, add-line-item-to-order, total-order, remove-item-from-inventory, and process-credit-card. The first element, check-inventory, is not synergistic with add-line-item-to-order. The first element is related to inventory management and the second is related to order management. The presence of inventory management does not always imply the presence of order management. The element check-inventory is, however, related to remove-item-from-inventory. Both are critical pieces of inventory management, and neither can exist without the other.

When we complete the process of assigning these five elements to ABCs 110, we will definitely end up with at least two ABCs 110. One ABC, inventory-management, will contain the elements check-inventory and remove-item-frominventory. The second ABC, order-management, will contain the elements add-line-item-to-order and total-order.

This leaves one of the original five elements, process-credit-card, unaccounted for. Clearly, this is not synergistic with inventory-management. But is it synergistic with order-management? Or does it belong in its own ABC 110, say, process-payment? Either of these could be true, depending on the specifics of the organization in question. For example, if this organization will never take any payment other than credit cards and if credit cards will never be accepted for anything other than orders, than process-credit-card IS synergistic with the items in order-management. If the answer to either of these questions is no, then process-credit-card IS NOT synergistic with the items in order-management and we need to start a new ABC 110.

Once we know what elements make up the EA 100, and once we know how to answer the question of synergy, we have a reproducible and verifiable process for partitioning an EA 100 into a series of ABCs 110. And since the EA 100 has been partitioned, it has also been greatly simplified. And since the EA 100 has been simplified, so have the underlying business process components 112 and technology (software) components 114. If two groups go through the process of partitioning the same EA 100, they will both come up with the exact same ABCs 110, assuming only that they agree on what elements make up the EA 100 and how the question of synergy is to be resolved.

Not only does the equivalence relation synergistic partition the EA 100, it does so in the best possible way. If we split up an ABC 110 further than allowed by the synergistic test, then we would end up with additional complexity due to new interactions required between elements in now different ABCs, a problem that would also occur if we split up the enterprise using some approach other than applying the synergistic test. If we split up an ABC 110 less than allowed by the synergistic test, then we would end up with subsets that had not been optimized with respect to complexity reduction.

So the application of the synergistic equivalence relation results in these major benefits:

1. It partitions the EA 100.
2. It does so in a reproducible way.
3. The resulting partitions are optimal from the perspective of complexity control.

By the end of the Partitioning Phase 1200, we have a series of ABCs 110 that collectively represent all or some major part of the EA 100.

Simplification

The third phase of the SIP Process 1000 is the Simplification Phase 1300.

The goal in the Simplification Phase 1300 is to take the ABCs 110 that resulted from the Partitioning Phase 1100 and simplify them as much as possible. Recall from the discussion above that the basic approach to post-partitioning simplification is state reduction. There are two approaches to state reduction. The first is removing elements from subsets. The second is removing subsets.

Removing elements from subsets translates to, with ABCs 110, either removing steps in a business process or removing functionality from software systems. The former is done by carefully looking at each step in the business process and finding any that are superfluous and can be eliminated. The later is done by carefully examining every capability planned in the software system and eliminating any that do not map to business requirements.

Removing subsets (ABCs 110) is more involved, but can result in large simplifications. There are three main approaches to ABC 110 removal: consolidation, outsourcing, and postponement. Consolidation means finding two or more ABCs 110 that effectively do the same thing and then replacing all by a single ABC 110 that serves all functions. Outsourcing means assigning some outside group to take responsibility for the ABC 110, such as by utilizing software-as-a-service, offshore development, or purchasing of pre-written ABC 110 components. Postponement means determining that a given ABC is either so low value or so high risk that it is effectively not worth doing, at least, in the near future.

Postponement is really more a part of the Prioritization 1400 phase, so it will be discussed later. The various approaches to outsourcing are all well known in the software industry, so will not be discussed here. This leaves us with consolidation.

Consolidation

Figure 4:
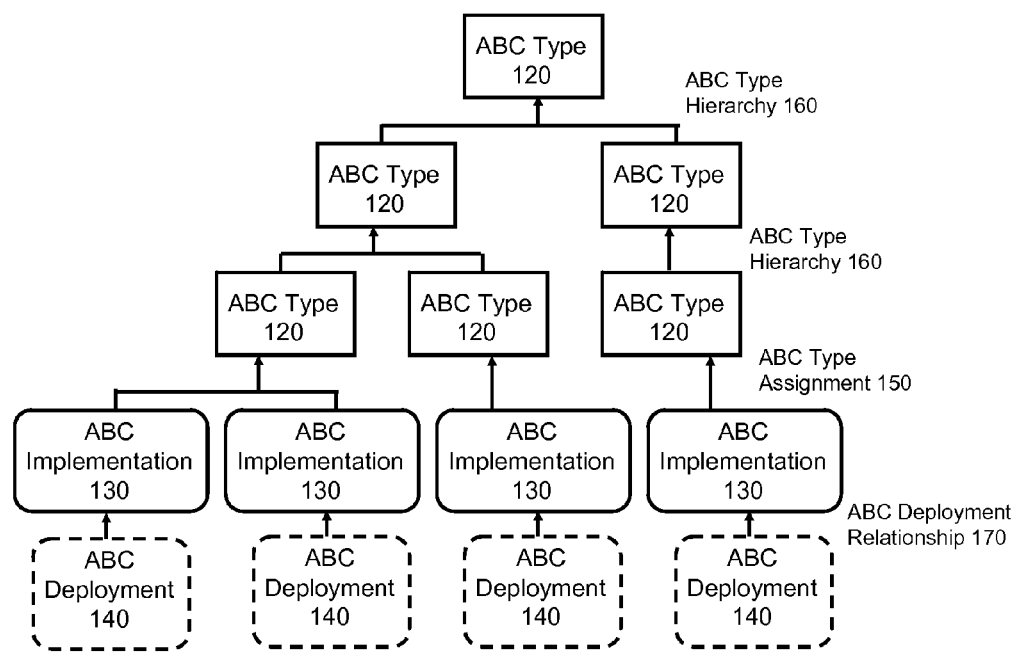
FIG. 4 is a diagram showing an ABC Relationship Diagram.

Consolidation is based on patterns between ABCs. To find these patterns, we distinguish between implementations and deployments. Then we assign types to each of the implementations and hierarchies to each of the types. We can graphically show each of the ABCs 110 in an EA 100 and how each is related to the others with regard to implementation, deployment, and type. A graphical ABC 110 chart is shown in FIG. 4.

An ABC Type 120 is a generic description of what an ABC 110 does. An example of an ABC Type 120 might be managing-motor-vehicles. ABC Types 120 can be related to each other through ABC Type Hierarchies 160. For example, a managing-motor-vehicles type might be related through an ABC Type Hierarchy 160 to a managing-assets type. When one ABC Type 120 is related to another ABC Type 120, one is a generalization of the other.

An ABC Implementation 130 is a specific collection of implemented software systems and business processes that may be deployed at one or more sites. One of these deployments is called an ABC Deployment 140.

All ABC Implementations 130 have an ABC Type Assignment 150 that defines what its type is. All ABC Deployments 140 have an ABC Deployment Relationship 150 with some ABC Implementation 130.

ABC Relationship Analysis

ABC relationship analysis helps one quickly find opportunities for consolidation. For example, two or more ABC Implementations 130 that both have the same ABC Type 120 are almost certainly candidates for consolidation.

Figure 5:
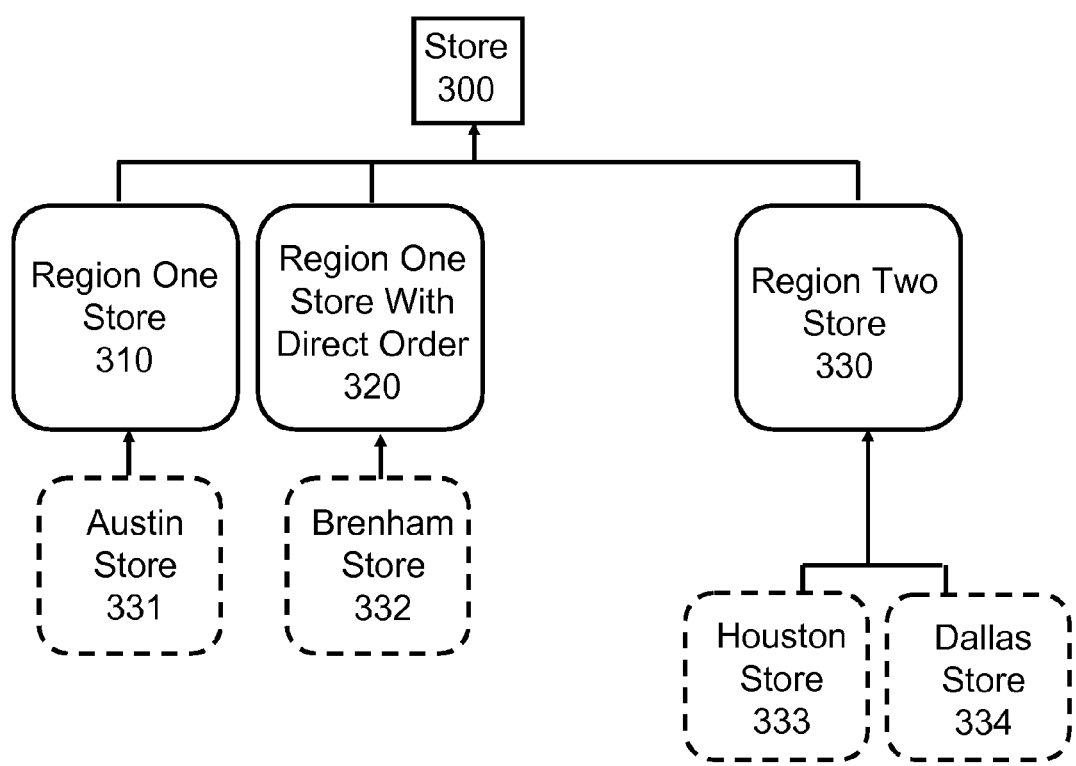
FIG. 5 is a diagram of a sample ABC Relationship Diagram of a Retail Operation.

FIG. 5 shows a diagram showing an ABC relationship analysis of a retail operation that shows many examples of multiple ABC Implementations 130 of the same ABC Type 120. For example, as shown in FIG. 5, there is one basic ABC Type 120 that, in this case, is a Basic Store Type 300. The ABC Type 120 Basic Store Type 300 has three implementations, a Region One Store 310, a Region One Store With Direct Order Implementation 320, and a Region Two Store 330. In principle, all of these implementations do very similar operations, namely, run a retail store (as we can see from their common type Store 300).

Anytime we see multiple implementations of the same type, we assume we have opportunities for ABC 110 elimination through consolidation. In this case, we would do so by creating a single implementation of the Store 300, and then deploy it in the four geographic locations.

ABC 110 relationship analysis can also help find examples where we have done a good job of simplification, especially in highlighting places where we have multiple ABC Deployments 140 of the same ABC Implementation 130. This helps validate that an architecture is a good architecture, at least, with respect to simplification.

The process of ABC 110 consolidation is greatly facilitated by the use of the synergistic equivalence relation to assign bits of functionality to ABCs 110.

Example

As an example of the Simplification Phase 1300, assume that at the completion of the Partitioning Phase 1200, that we had identified the following ABCs 110: Inventory-Management-South-Region, Inventory-Management-North-Region, Order-Processing, and Credit-Card-Processing.

If we did an ABC Relationship Diagram, similar to FIG. 5, we would notice that both Inventory-Management-South-Region and Inventory-Management-North-Region are implementations of the same ABC Type 120, which might be called Inventory-Management. This immediately tells us that these two ABCs 110 (Inventory-Management-South-Region and Inventory-Management-North-Region) can almost certainly be consolidated into a single implementation that can be deployed into two locations (South Region and North Region). This reduces by 50% the complexity of that part of the enterprise dealing with Inventory Management.

If we consider the ABC 110 Credit-Card-Processing, we might decide that this is a self contained (autonomous) piece of functionality that is not directly related to the business of this particular enterprise. This identifies this ABC as a candidate for outsourcing.

If we examine the ABC 110 Order-Processing, we might find a technical specification for NOTIFY-CUSTOMER-BY-EMAIL. Examining the business requirements for the ABC might show no corresponding business requirement. Therefore this technical requirement specification can be eliminated.

Because we have done a good job of partitioning in the Partitioning Phase 1200, we can now apply the simplification process to the ABCs, and reduce the complexity even further than it has already been reduced in the Partitioning Phase 1200.

If we assume that each of the four ABCs 110 (Inventory-Management-South-Region, Inventory-Management-North-Region, Order-Processing, and Credit-Card-Processing) were of equal complexity, then by the end of the Simplification Phase 1300 we will have further reduced the complexity by more than 50%. We would have achieved 25% reduction due to consolidation of the Inventory-Management system, 25% reduction due to the outsourcing of Credit-Card-Processing, and some additional amount due to the elimination of extraneous functionality in Order-Processing.

Prioritization

The fourth phase of the SIP Process 1000 is the Prioritization Phase 1400. By the time we get to this phase, we will have generated a collection of simplified ABCs 110, which, taken as a whole, represent a partition of the EA 100. In the Prioritization Phase 1400, we take that collection and determine the best possible order in which to implement the ABCs 110. In this embodiment of the invention, we consider both business value and risk in prioritizing the ABCs 110 for delivery. The higher the business value, the higher the priority. The higher the risk, the lower the priority.

Figure 6:
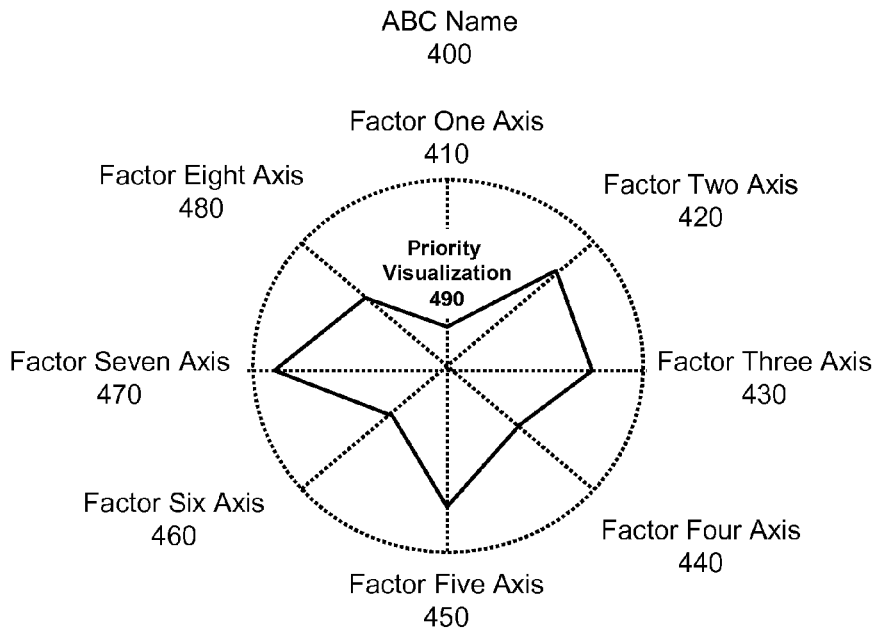
FIG. 6 is diagram of a Risk/Value Graph.

In order to consider both business value and risk, this embodiment of the invention uses Risk/Value Graphs. A basic Risk/Value Graph is shown in FIG. 6. In this embodiment of the invention, there are eight different Risk/Value factors, each corresponding to one of the axis on the Risk/Value Graph as shown in FIG. 6. In other embodiments, there may be fewer or more than 8 factors, or other value and risk analysis may be performed.

As values are assigned to each of the Factor Axis (410, 420, 430, 440, 450, 460, 470, and 480) an overall picture emerges of the Risk/Value associated with this implementation of this ABC 110. This picture is called the Priority Visualization 490. In this analysis, ABCs 110 with smaller areas in their Priority Visualizations 490 are assumed to be a lower priority for implementation than ABCs 110 with larger areas in their Priority Visualizations 490.

If the Priority Visualization 490 for a given ABC 110 has a small enough area, then it will effectively delayed indefinitely, since there will always be higher area projects competing for resources. This is the notion of postponement, discussed earlier.

The number of Factor Axis are arbitrary. This number is usually chosen and the axis are defined in the Preparation Phase 1100 of the SIP Process 1000.

Example

Assume that at the end of the Simplification Phase 1300, we have identified three ABCs that need to be implemented: Inventory-Management, Order-Processing, and Credit-Card-Processing. We have already decided to outsource Credit-Card-Processing, but this still leaves us with two ABCs that need to be implemented: Inventory-Management and Order-Management. In the Prioritization Phase 1400 the question we are now addressing is which one we should implement first. Note that because we have partitioned the EA 100 using the equivalence relation synergistic, we can be assured that the various ABCs 110 are autonomous with respect to each other. This means that either ABC can be implemented and it will have a full set of functionality that it needs to complete its work. In the Prioritization Phase 1400 we will decide which of these two ABCs 110 to implement first, Inventory-Management or Order-Processing.

Figure 7:
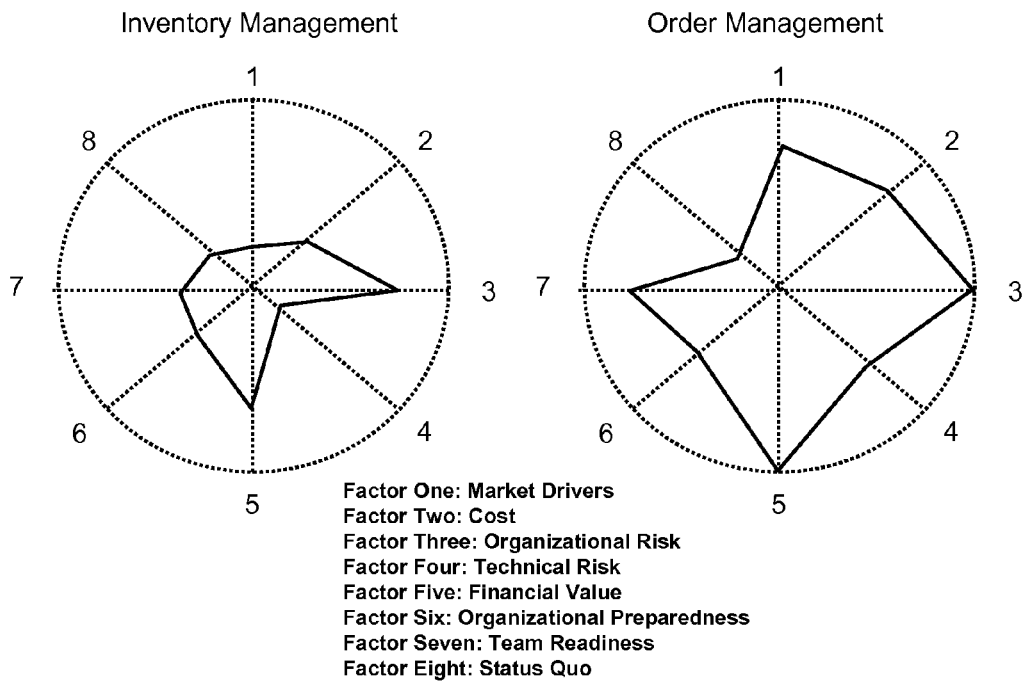
FIG. 7 is a diagram comparing two Risk/Value Graphs

In this example, we have decided to use eight Factor Axes as follows:

Factor One: Market Drivers
Factor Two: Cost
Factor Three: Organizational Risk
Factor Four: Technical Risk
Factor Five: Financial Value
Factor Six: Organizational Preparedness
Factor Seven: Team Readiness
Factor Eight: Status Quo As we analyze each Risk/Value factor in turn and plot the values, we get the two charts shown in FIG. 7. As FIG. 7 shows, the Priority Visualization 490 for Order-Management far exceeds that of Inventory Management. This is a clear and visible sign that the order of iteration should be Order-Management first, Inventory-Management second.

Iteration

The fifth phase of the SIP Process 1000 is the Iteration Phase 1500. This is the phase in which the collection of ABCs 110 that were prioritized in the Prioritization Phase 1400 are actually implemented with technology components 114 and/or business process components 112. This embodiment of the invention does not specify how this implementation should proceed, since there are a number of processes already available, such as Microsoft Solution Framework, Rational's Unified Process, or one of the Agile Processes. Any of these prior art implementation processes can be used with the method and system of the current invention.

Criteria for Testing an EA for Goodness

Because this invention includes a definition for goodness of an EA 100 as minimally complex, and because minimally complex is defined mathematically, we can test the enterprise architectures defined through the SIP Process 1000 to see if it could be improved. One method of testing the enterprise architectures is illustrated by the decision tree shown in FIG. 8.

Figure 8:
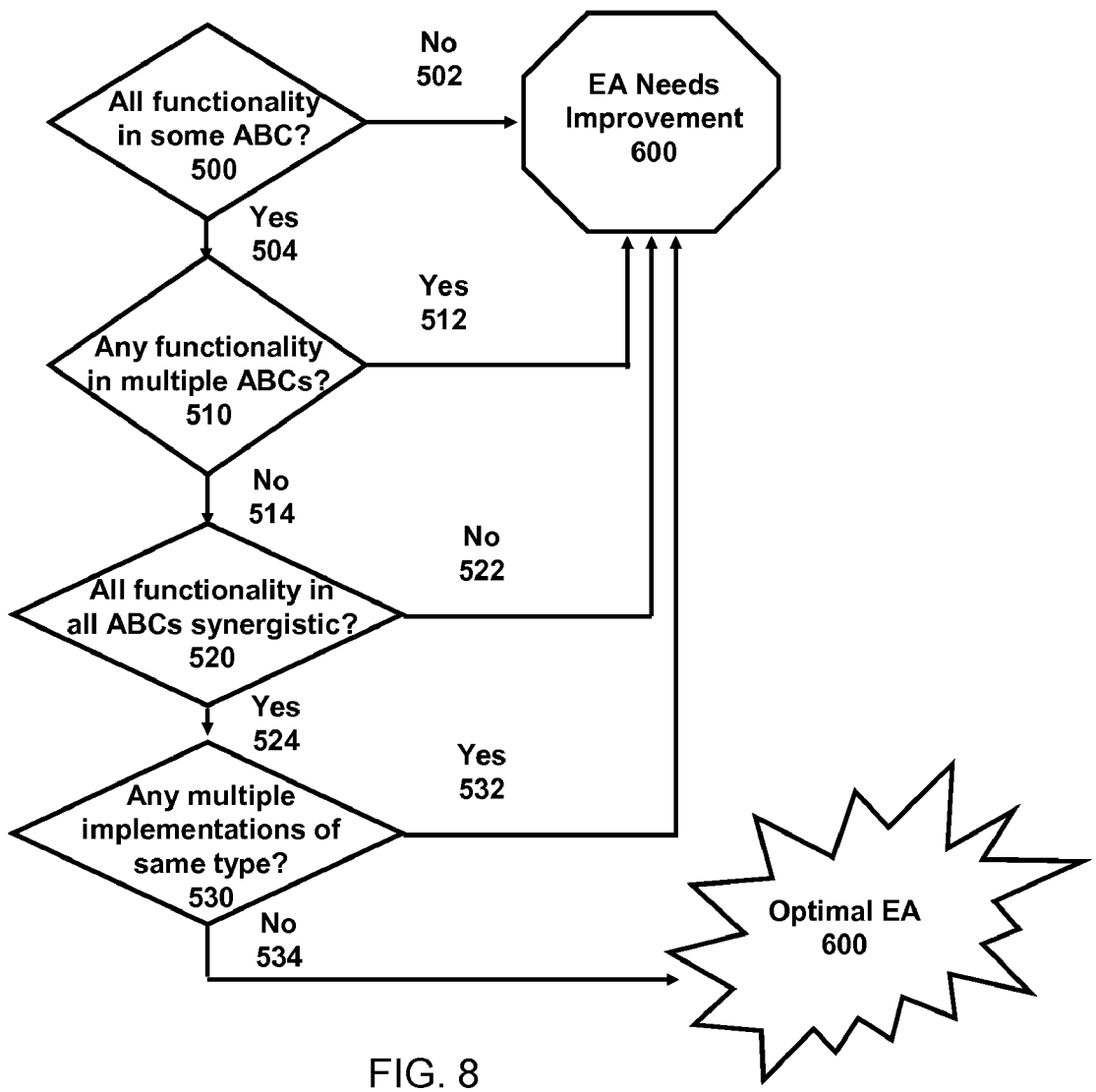
FIG. 8 is a diagram of the decision flow for validating an enterprise architecture.

As shown in FIG. 8, the first Test 500 is to make sure that all of the functionality in question in the overall EA 100 is found in one of the ABCs 110. If the answer to this is No 502, then the EA 100 Needs Improvement 600. If the answer to this is Yes 504, then we continue to the next Test 510. The Test 500 relates back to the mathematical requirements of partitioning, one of which is that all elements of the unpartitioned universe live in one, and only one, of the subsets making up the partition.

The second Test 510 is to verify that none of the functionality of the EA 100 is found in more than one ABC 110. If multiple functionality is found Yes 512 then the EA 100 Needs Improvement 600. If none is found No 514, then this Test 510 passes and we continue to the third Test 520. The second Test 510 also relates back to the mathematical requirements of partitioning, one of which is that no element of the unpartitioned universe can live in more than one of the subsets making up the partition.

The third Test 520 is to check that the functionality in each of the ABCs 110 passes the equivalence relationship test. In other words, all functionality in each ABC 110 passes equivalence with all other functionality in that ABC. If any functionality is found that does not pass equivalence with all other functionality in that ABC 100, then the test fails 522 and the EA Needs Improvement 600. Otherwise, the Test 520 passes Yes 524 and we go to the fourth and final Test 530.

The last Test 530 is to check the ABC 100 relationships as shown in FIG. 4. If any examples of multiple ABC Implementations 130 are found of a given ABC Type 120, then this Test 530 fails, and the EA 100 Needs Improvement 600. Otherwise the test passes, and the EA 100 is validated as optimal 600.

In this embodiment of the invention, these Tests (500, 510, 520, and 530) are done by human inspection. It would be easy in other embodiments to automate this with software tools and other embodiments could modify these tests, change their order, or make other variations.

Benefits of Invention

There are three main advantages to this invention over current methodologies. These are reduced cost, verifiability, and reproduciblity.

Cost reductions are primarily due to dramatic reductions in the amount of complexity in the overall enterprise architecture. Since both the cost of implementation and the cost of maintenance are primarily related to complexity, the huge reductions in complexity translate directly to reduced cost in building and supporting software systems to support business processes.

Verifiability is primarily due to the close relationship between the mathematical models and the SIP Process 1000. This relationship allows this embodiment of the invention to directly test the resulting enterprise architecture against tests for formal partitioning and correct application of equivalence relations.

Reproducibility means that multiple groups of practitioners with similar skills analyzing the same enterprise will come up with essentially similar architectures. This is because most architectural decisions are based on mathematical tests (such as synergy and type equivalence) rather than on personal opinion (as are other enterprise architecture methodologies.)

DESCRIPTION OF EMBODIMENT

Automation

One alternative embodiment of this invention would be to automate any number of the steps with automated workflow engines or other software support systems. For example, a database could be constructed that kept track of all the ABCs 110 and their ABC Types 120 and then automatically identify duplicate implementations. Another software program could track all of the functionality within the EA 100 and then use artificial intelligence algorithms to check for proper use of equivalence relations to construct ABCs 110.

DESCRIPTION OF EMBODIMENT

Eliminated Pieces

One alternative embodiment of this invention is to eliminate one or more of the five pieces of the invention. The five pieces are (1) a definition for what constitutes a good EA; (2) a mathematical model that helps us understand, mathematically, what good looks like; (3) a series of mathematically grounded algorithms that are used to create a good EA; (4) a process that embodies these algorithms to make them easy to learn and apply; and (5) a criteria for evaluating EAs. For example, another embodiment of this invention would be to eliminate the mathematical model and focus only on the process steps.

DESCRIPTION OF EMBODIMENT

Adding Pieces

An alternative embodiment of this invention is to add additional pieces to this invention. For example, existing EA methodologies often include processes focused on checking for alignment between business processes and technology solutions. An alternative embodiment of this invention is to add pieces to address these issues into this invention.

DESCRIPTION OF EMBODIMENT

Changing Validation Tests

An alternative embodiment of this invention is to modify the validation tests shown in FIG. 8 by adding additional validations tests (such as checking the alignment between business processes and software systems), removing validation tests (such as not including Test 500 for all functionality being accounted for), or rearranging the order of the validation tests (such as performing the multiple implementation Test 530 before the synergistic Test 520).

DESCRIPTION OF EMBODIMENT

Alternative Prioritizations

This embodiment of this invention uses Risk/Value Graphs as shown in FIG. 6 to determine the order in which iterations should occur. There are many other approaches that could be used in other embodiments. For example, one could assign priority order based on a vote of the governing board that controls the overall architecture. One could assign priority order based on executive decision. One could use the basic idea of prioritizing based on value and risk, but not use Risk/Value Graphs to represent such an analysis. Or one could use some other approach to assigning priority order and use a graph that visually appears similar to Risk/Value Graphs to represent that priority.

DESCRIPTION OF EMBODIMENT

Modified SIP Process

Another alternative embodiment of this invention is to modify the SIP Process 1000. For example, the Prioritization Phase 1400 and Iteration Phase 1500 could be consolidated. Changes could also be made in individual phases, for example, the Iteration Phase 1500 which delivers ABCs 110 one at a time could be modified to allow parallel implementation, resulting in delivery of many or all ABCs 110 at the same or similar time.

DESCRIPTION OF EMBODIMENT

Information Technology Architecture

Another alternative embodiment of this invention is to modify the SIP Process 1000 to not apply to Enterprise Architectures but only to the piece of Enterprise Architecture that deals with Information Technology Architecture.

DESCRIPTION OF EMBODIMENT

Business Process Architecture

Another alternative embodiment of this invention is to modify the SIP Process 1000 to not apply to Enterprise Architectures but only to the piece of Enterprise Architecture that deals with Business Process Architecture.

DESCRIPTION OF EMBODIMENT

Validation Only

Another alternative embodiment of this invention is to use only the validation tests (500, 510, 520, 530) to validate an existing architecture (either at the enterprise level, the business process level, or the information technology level) to see if it can be improved.

These and other variations will be apparent to those skilled in the art, and the scope invention is not limited to the examples and embodiments described above.

What is claimed is:

1. A method for creating a minimally complex enterprise architecture, the method comprising
   providing a mathematical model for complexity by
      equating the number of possible states of a system with its complexity by equating states in a business process with decision points and decision branches, and equating states in an information technology system with variables and numbers of possible values,
      reducing the number of possible states of a system through mathematical partitioning, thereby diving the original system into subsets such that each element of the original system lives in one and only one subset, and using an equivalence relation to define the partitioning;
   providing, on a computer, a model for enterprise architectural complexity that maps back to the mathematical model for complexity; and
   producing, with a process that is based on the model for enterprise architectural complexity, an enterprise architecture that is minimally complex as predicted by the model.

2. The method of claim 1 wherein providing a mathematical model for complexity further comprises
   further reducing the number of possible states of a system through removal of subsets of the system; and
   further reducing the number of possible states of a system through removal of elements from remaining subsets.

3. The method of claim 1 wherein providing a model for enterprise architectural complexity that maps back to the mathematical model for complexity further comprises
   mapping an enterprise architecture to an unpartitioned mathematical system;
   demonstrating that synergistic maps to a mathematical equivalence relation; and
   mapping a subset of a partition to a subset of an enterprise architecture.

4. The method of claim 1 wherein producing, with a process that is based on the model for enterprise architectural complexity, an enterprise architecture that is minimally complex as predicted by the model further comprises
   providing at least one method for
      partioning, with an equivalence relation, synergistic, the enterprise architecture so that all elements of the original enterprise architecture are assigned to one and only one autonomous subset;
      reducing the number of autonomous subsets to a minimal subset;
      reducing the number of elements in the minimal subset to create a minimally populated minimal subset; and
      assigning implementation priorities to the minimally populated minimal subset.

5. The method of claim 4 wherein providing a method for partitioning, with the equivalence relation, synergistic, the enterprise architecture further comprises
   assigning elements of the unpartitioned architecture to subsets such that all elements in a given subset are synergistic with each other and are not synergistic with any other elements of any other subsets.

6. The method of claim 4 wherein providing a method for reducing the number of elements in the minimal subset to create a minimally populated minimal subset further comprises
   removing business process elements that are not required for meeting business requirements; and
   removing information technology elements that are not required for supporting business processes.

7. The method of claim 4 wherein providing a method for reducing the number of autonomous subsets further comprises
   assigning a type description to each autonomous subset;
   checking for multiple implementations of the same type; and
   consolidating the multiple implementations into a single autonomous subset.

8. The method of claim 4 wherein providing a method for assigning implementation priorities to subsets further comprises
    an analysis of risk of implementing each subset;
    an analysis of the business value of implementing each subset; and
    a consolidation of the risk and value analysis into a single visual radar graph that can be readily compared against similar analysis of other subsets and used as a basis for assigning a priority order.

9. The method of claim 1 wherein providing a model for enterprise architectural complexity that maps back to the mathematical model for complexity further comprises
    providing a model that produces a business process architecture that is minimally complex.

10. The method of claim 1 wherein providing a model for enterprise architectural complexity that maps back to the mathematical model for complexity further comprises
    providing a model that produces an information technology systems architecture that is minimally complex.

11. The method of claim 1 further comprising
    performing a validation test that can test whether or not a given enterprise architecture has achieved a state of minimal complexity.

12. The method of claim 11 wherein performing a validation test that can test whether or not a given enterprise architecture has achieved a state of minimal complexity further comprises
    checking each of the elements of the original enterprise architecture to ensure that each lives in one and only one partition subset;
    checking each of the elements of each of the subsets for synergy with other elements of that same subset; and
    checking each subset for type overlap with other subsets.

* * * * *